E. WEBER.
Device for Adjusting Clothes-Lines.
No. 225,958. Patented Mar. 30, 1880.
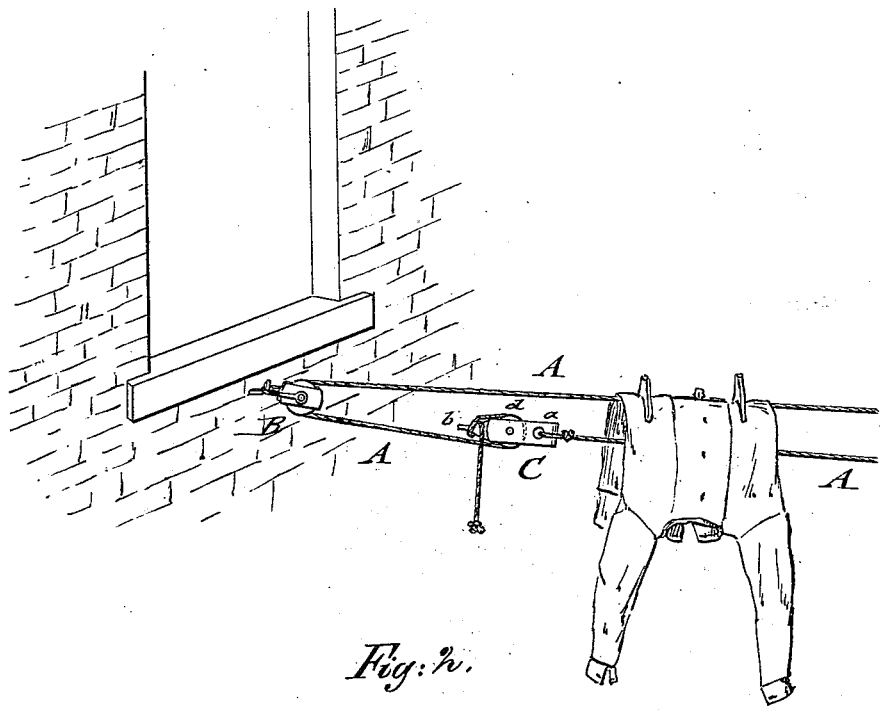
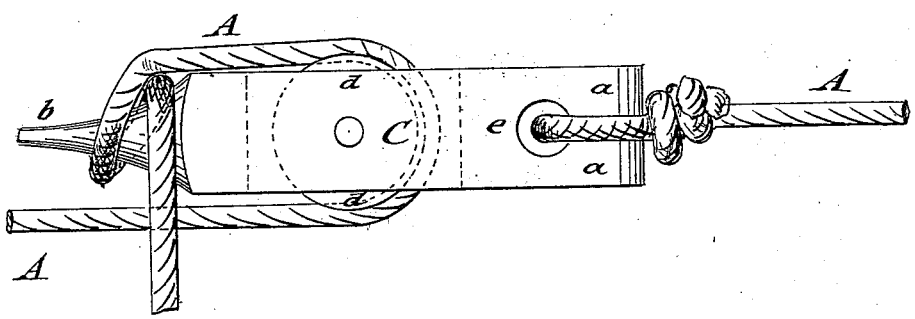
Witnesses:
C. Karp
Otto Risch
Inventor:
Eduard Weber
by Paul Goepel
Attorney.

UNITED STATES PATENT OFFICE.

EDUARD WEBER, OF BROOKLYN, NEW YORK.

DEVICE FOR ADJUSTING CLOTHES-LINES.

SPECIFICATION forming part of Letters Patent No. 225,958, dated March 30, 1880.

Application filed November 1, 1878.

*To all whom it may concern:*

Be it known that I, EDUARD WEBER, of the city of Brooklyn, in the county of Kings and State of New York, have invented certain new and useful Improvements in Devices for Adjusting Clothes-Lines, of which the following is a specification, reference being made to the accompanying drawings, in which—

Figure 1 represents a clothes-line with my improved adjusting device, and Fig. 2 is a side view of the adjusting device, shown on enlarged scale.

Similar letters of reference indicate corresponding parts.

This invention is designed to prevent the stretching and breaking of traveling clothes-lines in rainy weather, and also to facilitate the adjustment of the same to any desired length without the annoyance connected with the present untying and retying of the lines.

At present the usual traveling clothes-lines—that is, lines traveling round various pulleys—are rapidly worn out by the contraction of the lines in wet weather, which frequently causes the breaking of the lines and the dropping of the same, together with the clothes, still suspended therefrom. Another difficulty in the use of the present clothes-line is found in the proper stretching and tying of the lines, which is fatiguing and difficult, specially in cold weather, when the lines are frozen.

These objections are intended to be overcome by my invention, which consists of a line and an adjusting device— to wit, a pulley-block—over the pulley of which one end of the line is passed, while the other end is permanently secured to the block. The loose adjustable end of the line is looped over the tapering or pointed end or finger of the pulley-block and retained rigidly by the tension of the stretched line. The opposite end of the block is perforated and rounded off at the corners, so as to admit the attaching of the fixed end of the line without chafing. The line is instantly released from the pointed end of the block whenever, in case of rain or for other reasons, undue strain is to be obviated, by pulling at the loose but knotted end of the line and then letting it go, the line being then retained by the terminal knot on the block and suspended loosely without danger of breaking by contraction.

Referring to the drawings, A represents a clothes-line, which is hung in the customary manner at both ends to the pulley-blocks B, of any approved construction.

The connecting ends of the line A, instead of being tied together in the usual manner, are applied to an adjusting device, C, which is made in the shape of a pulley-block, and of wood or other suitable material.

The block C is made with a solid portion, $a$, at one end, and with a conically-tapering point, $b$, at the other end. Between the solid and pointed ends is placed, in a recess of the block, the pulley $d$, over which one end of the line A is passed. This loose end of the line is provided with a terminal knot, which prevents the escape of the line from the pulley-block C. The other end of the line A is passed through a transverse hole, $e$, of the solid end portion of the block, the corners of the solid portion being rounded off to prevent the chafing and cutting of the line.

The loose end of the line is attached by means of a loop, as shown clearly in Fig. 2, over the point $b$, and securely held in position thereon by the tension of the line, which has first been stretched taut for that purpose.

Whenever, in case of rain or after use, the strain is desired to be taken from the line, the loose knotted end is taken hold of and the looped portion released from the point by a quick pull on the line. It will be apparent that this can be done by using one hand only— an important result, as frequently the block is some distance from the ground or from a window. The line is then allowed to drop as far as the knot in it will permit. The tension being, in this position of the line, entirely removed therefrom, causes, therefore, no undue strain, contraction, or breakage of the line, which latter may, by the adjusting-block, be easily and conveniently readjusted to the proper tension.

The adjusting device facilitates thus the handling of the clothes-line, and renders the same more durable and less annoying when in use.

Having thus described my invention, I claim as new and desire to secure by Letters Patent—

1. The combination, with a clothes-line traveling on pulleys, of a pulley-block, C, permanently connected at one end to the line, and provided at the other end with a straight tapering finger, round which the line may be looped, as set forth.

2. A pulley-block provided at one end with a straight tapering finger upon which to loop the line, and from which it may be drawn longitudinally when looped, as set forth.

In testimony that I claim the foregoing as my invention I have signed my name, in presence of two witnesses, this 28th day of October, 1878.

EDUARD WEBER.

Witnesses:
PAUL GOEPEL,
ADOLF DENGLER.